(12) United States Patent
Lott

(10) Patent No.: US 8,079,328 B2
(45) Date of Patent: Dec. 20, 2011

(54) COLLAPSIBLE ANIMAL TRANSPORT APPARATUS

(76) Inventor: Christopher M. Lott, Minneapolis, KS (US)

( * ) Notice: Subject to any disclaimer, the term of this patent is extended or adjusted under 35 U.S.C. 154(b) by 241 days.

(21) Appl. No.: 12/420,503

(22) Filed: Apr. 8, 2009

(65) Prior Publication Data
US 2010/0258059 A1 Oct. 14, 2010

(51) Int. Cl.
*A01K 1/03* (2006.01)
(52) U.S. Cl. .................. 119/499; 119/498; 119/453
(58) Field of Classification Search .................. 119/496, 119/498, 453, 472, 482, 499
See application file for complete search history.

(56) References Cited

U.S. PATENT DOCUMENTS

| | | | | |
|---|---|---|---|---|
| 2,258,344 A | * | 10/1941 | Walker | 119/494 |
| 3,280,796 A | * | 10/1966 | Hatcher | 119/499 |
| 3,522,904 A | * | 8/1970 | Locke et al. | 229/120.1 |
| 4,109,427 A | * | 8/1978 | O'Brian et al. | 52/58 |
| 4,467,572 A | * | 8/1984 | Somers et al. | 52/70 |
| 5,115,762 A | * | 5/1992 | Long | 119/499 |
| 5,493,818 A | * | 2/1996 | Wilson | 52/71 |
| 6,131,534 A | | 10/2000 | Axelrod | |
| 6,408,797 B2 | * | 6/2002 | Pivonka et al. | 119/498 |
| 6,863,030 B2 | * | 3/2005 | Axelrod | 119/498 |
| 7,025,019 B2 | | 4/2006 | Axelrod et al. | |

* cited by examiner

*Primary Examiner* — Rob Swiatek
*Assistant Examiner* — Kristen Hayes
(74) *Attorney, Agent, or Firm* — Dale J. Ream

(57) ABSTRACT

A collapsible animal transport apparatus includes a planar floor member, front and rear members each having a lower side rotatably coupled to a rear side of the floor member, and a front member having a lower side rotatably coupled to a floor member front side. First and second side members have respective upper and lower sides, respective lower sides being rotatably coupled to opposed sides of the floor member. The apparatus includes first and second roof members each having interior and exterior sides, respective roof member exterior sides being rotatably coupled to first and second side member upper sides, respectively. The second roof member interior side is removably coupled to the first roof member interior side. The front and rear members, the first and second side members, and the first and second roof members are movable between a storage configuration and a use configuration.

6 Claims, 4 Drawing Sheets ated in the bed of a pickup truck. In addition, it would be desirable to have a collapsible animal transport apparatus that may be assembled or collapsed by a single person.

COLLAPSIBLE ANIMAL TRANSPORT APPARATUS

BACKGROUND OF THE INVENTION

The present invention relates generally to animal transport devices and, more particularly, to a collapsible animal transport apparatus that is easy to set up, to use to transport multiple animals, and to collapse for storage.

Pet owners, and especially dog owners, often have a need and desire to transport one or more pets to another location. Some movement of animals may merely be to a veterinarian for medical care or to a park for exercise. Other times, one or more dogs may be transported to a hunting location to assist the owner in hunting and retrieving game. In most cases, animal transport devices are only needed on an infrequent basis and must be stored when not in use.

Various devices are known or have been proposed in the art for transporting animals. More particularly, portable kennels configured to be hauled in the bed of a truck have been used to contain and carry one or more dogs in the bed of a pickup truck. Although assembly effective for their intended purposes, the existing devices tend to be large, bulky, and difficult to store when not in use.

Therefore, it would be desirable to have a collapsible animal transport apparatus that is easy to collapse for storage and easy to assemble when needed. Further, it would be desirable to have a collapsible animal transport apparatus that is capable of transporting one to four animals and configured for being situated in the bed of a pickup truck. In addition, it would be desirable to have a collapsible animal transport apparatus that may be assembled or collapsed by a single person.

SUMMARY OF THE INVENTION

A collapsible animal transport apparatus according to the present invention includes a planar floor member, front and rear members each having a lower side rotatably coupled to a rear side of the floor member, and a front member having a lower side rotatably coupled to a floor member front side. First and second side members have respective upper and lower sides, respective lower sides being rotatably coupled to opposed sides of the floor member. The apparatus includes first and second roof members each having interior and exterior sides, respective roof member exterior sides being rotatably coupled to first and second side member upper sides, respectively. The second roof member interior side is removably coupled to the first roof member interior side. The front and rear members, the first and second side members, and the first and second roof members are movable between a storage configuration and a use configuration.

Therefore, a general object of this invention is to provide an animal transport apparatus that is easily movable between storage and use configurations.

Another object of this invention is to provide an animal transport apparatus, as aforesaid, for containing and transporting one or more animals when at a use configuration.

Still another object of this invention is to provide an animal transport apparatus, as aforesaid, that may be situated in the bed of a pickup truck when at a use configuration.

Yet another object of this invention is to provide an animal transport apparatus, as aforesaid, that may be moved between use and storage configurations by a single person.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIGS. 2a to 4a show the animal transport apparatus in progressively more collapsed configurations;

DESCRIPTION OF THE PREFERRED EMBODIMENT

Figure 1:
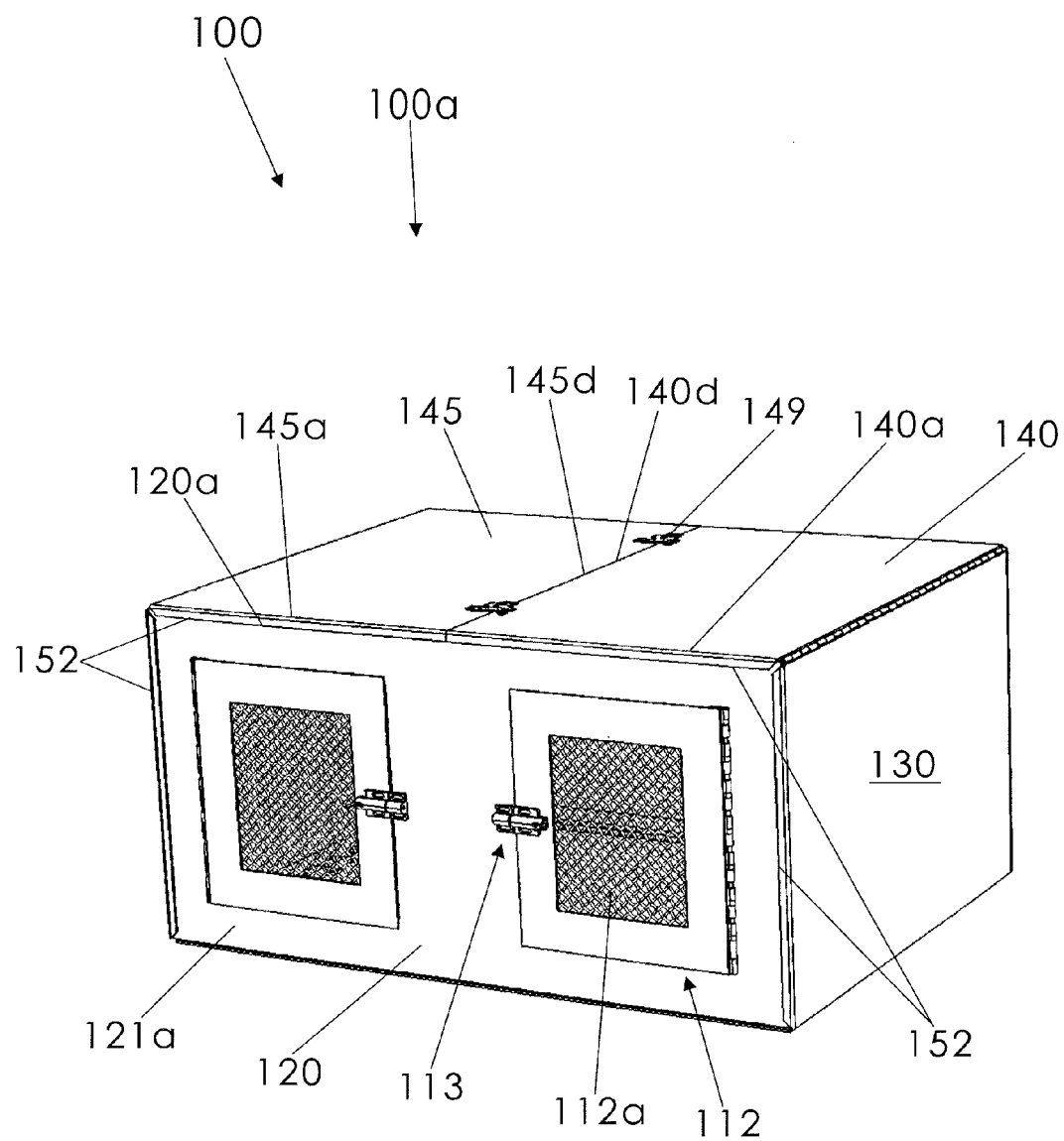
FIG. 1 is a perspective view of a collapsible animal transport apparatus according to a preferred embodiment of the present invention.

A collapsible animal transport apparatus will now be described in detail with reference to FIG. 1 through FIG. 4b of the accompanying drawings. More particularly, a collapsible animal transport apparatus 100 of one embodiment includes a floor member 110, front and rear members 120, 125, first and second side members 130, 135, and first and second roof members 140, 145.

Figure 2A:
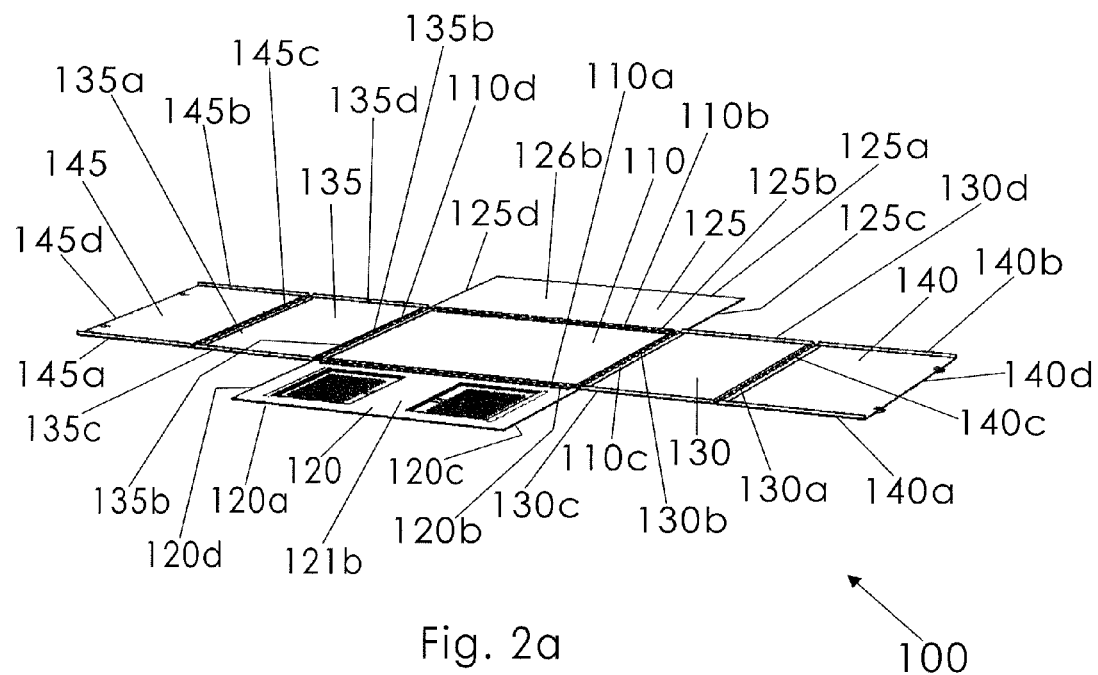
Figure 4A:
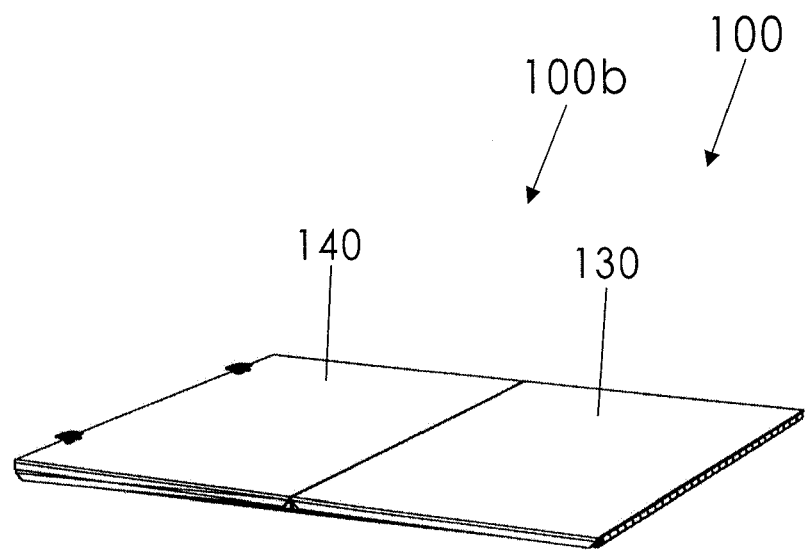
Figure 4B:
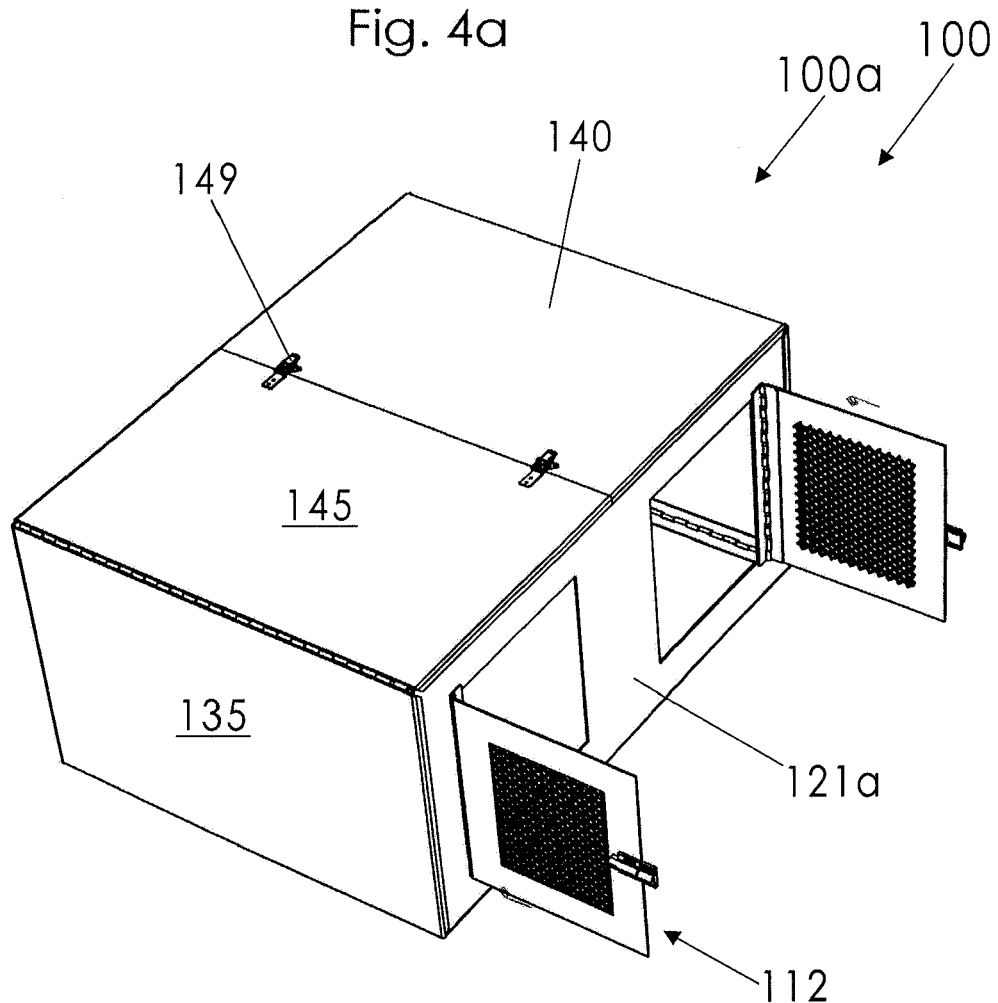
FIG. 4b is a perspective view of the animal transport apparatus as in FIG. 1 with the doors in an open configuration.

As shown in FIG. 2a and FIG. 4b, the floor member 110 may be generally planar and has opposed front and rear sides 110a, 110b and opposed first and second lateral sides 110c, 110d. The floor member 110 may be rigid or padded, and it may be preferable for the floor member 110 to be constructed of non-porous material that may be easily sanitized.

The front member 120 (FIG. 1 through FIG. 3b and FIG. 4b) has opposed upper and lower sides 120a, 120b and opposed first and second lateral sides 120c, 120d. The front member lower side 120b is rotatably coupled to the floor member front side 110a, such as by one or more hinge. As best shown in FIG. 1 and FIG. 4b, the front member 120 has at least one door 112. The door(s) 112 may be rotatable, slidable, or removable and may have vented portions 112a that are constructed out of a mesh material, for example. Locks 113 may be included to selectively maintain the door (s) 112 at a closed position, as shown in FIG. 1.

The rear member 125 (FIGS. 2a and 2b) has opposed upper and lower sides 125a, 125b and opposed first and second lateral sides 125c, 125d. The rear member lower side 125b is rotatably coupled to the floor member rear side 110b, such as by one or more hinge.

Figure 2B:
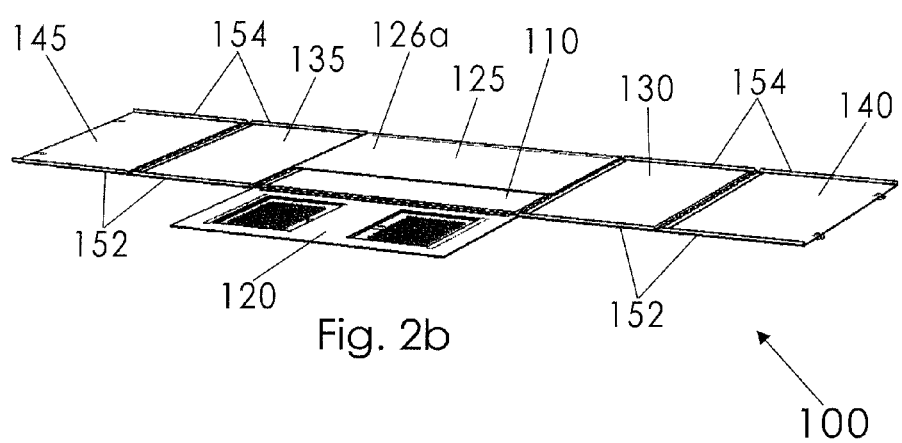
Figure 3A:
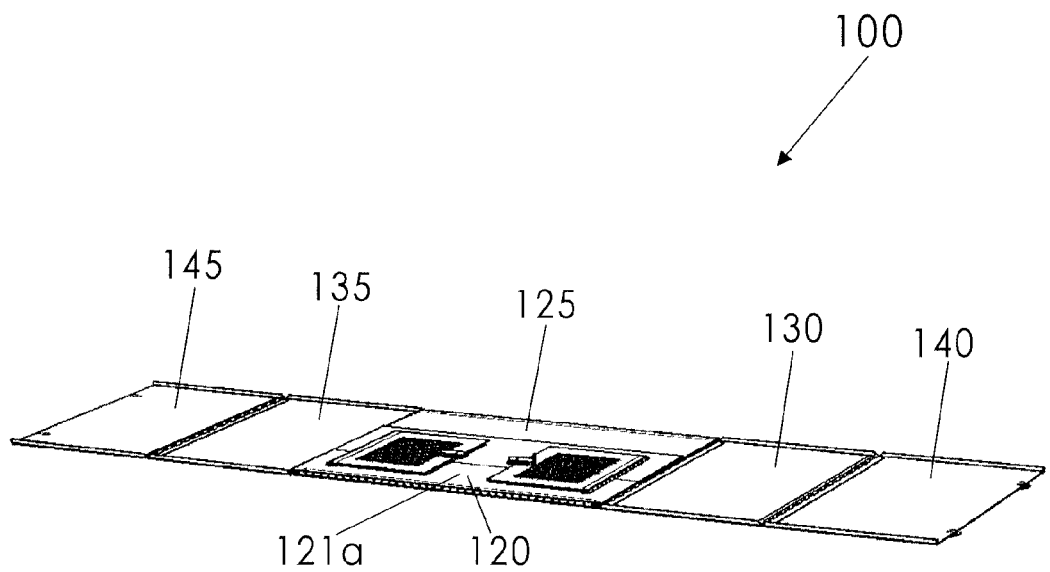
Figure 3B:
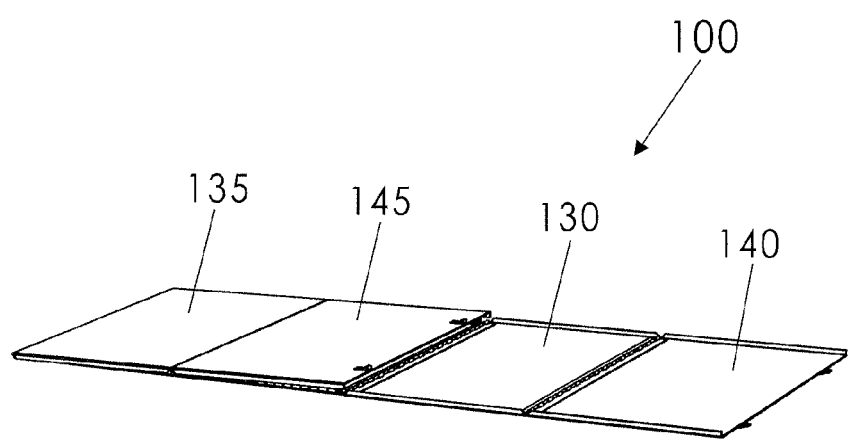

As shown in FIG. 1 through FIG. 2b and in FIG. 4b, the first side member 130 has opposed upper and lower sides 130a, 130b and opposed front and rear sides 130c, 130d, and the second side member 135 has opposed upper and lower sides 135a, 135b and opposed front and rear sides 135c, 135d. The first side member lower side 130b is rotatably coupled to the floor member first side 110c, such as by one or more hinge, and the second side member lower side 135b is rotatably coupled to the floor member second side 110d, such as by one or more hinge.

Still referring to FIG. 1 through FIG. 2b and to FIG. 4b, the first roof member 140 has opposed front and rear sides 140a, 140b and opposed exterior and interior sides 140c, 140d, and the second roof member 145 has opposed front and rear sides 145a, 145b and opposed exterior and interior sides 145c, 145d. The first roof member exterior side 140d is rotatably coupled to the first side member upper side 130a, such as by one or more hinge, and the second roof member exterior side 145d is rotatably coupled to the second side member upper side 135a, such as by one or more hinge. As shown in FIG. 1 and FIG. 4b, the first roof member interior side 140d may be removably coupled to the second roof member interior side 145d, such as by one or more latch 149.

In use, the front and rear members 110, 120, the first and second side members 130, 135, and the first and second roof members 140, 145 are movable between a use configuration 100a (FIG. 1 and FIG. 4b) and a storage configuration 100b (FIG. 4a). When at the use configuration 100a, the front sides 140a, 145a of the first and second roof members 140, 145 are adjacent the front member upper side 120a; the rear sides 140b, 145b of the first and second roof members 140, 145 are adjacent the rear member upper side 125a; and the first roof member interior side 140d is coupled to the second roof member interior side 145d (e.g., by latch(es) 149). When at the storage configuration 100b, the first roof member interior side 140d is separated from the second roof member interior side 145d; the rear member first lateral side 125c is adjacent the floor member first lateral side 110c; the front member first lateral side 120c is adjacent the rear member first lateral side 125c; and the front sides 130c, 135c, 140a, 145a of the first and second side members 130, 135 and the first and second roof members 140, 145 are adjacent the floor member front side 110a. Animals may be housed in the apparatus 100 when at the use configuration 100a, and the apparatus 100 may be easily and compactly stored when at the storage configuration 100b.

To move from the use configuration 100a to the storage configuration 100b, the first roof member interior side 140d may be separated from the second roof member interior side 145d and the floor member 110, the front and rear members 120, 125, the first and second side members 130, 135, and the first and second roof members 140, 145 may be laid out flat as shown in FIG. 2a. The rear member 125 may be rotated onto the floor member 110 (FIG. 2b), the front member 120 may be rotated onto the rear member 125 (FIG. 3a), the second side member 135 and the second roof member 145 may be rotated onto the front member 120 (FIG. 3b), and first side member 130 and the first roof member 140 may be rotated onto the second side member 135 and the second roof member 145 (FIG. 4a). It should be understood that these steps may be performed in various orders and that "adjacent" does not require elements to touch or to be immediately next to each other.

Various means may be included to selectively maintain the use configuration 100a. For example, various latches may be included. Alternately, or additionally, the front sides 130c, 135c, 140a, 145a of the first and second side members 130, 135 and the first and second roof members 140, 145 may have front protrusions 152 extending therealong (FIG. 2b) that are adjacent the front member 120 when at the use configuration 100a. Moreover, the rear sides 130d, 135d, 140b, 145b of the first and second side members 130, 135 and the first and second roof members 140, 145 may have rear protrusions 154 extending therealong (FIG. 2b) that are adjacent the rear member 125 when at the use configuration 100a. In some embodiments, the front and rear protrusions 152, 154 are formed by bending the first and second side members 130, 135 and the first and second roof members 140, 145, and the front and rear protrusions 152, 154 may provide structural stability to the first and second side members 130, 135 and the first and second roof members 140, 145.

To maintain the use configuration 100a in some embodiments, at least one front protrusion 152 is adjacent an exterior face 121a of the front member 120 and at least one front protrusion 152 is adjacent an interior face 121b of the front member 120 such that a line passing between the two front protrusions 152 must pass through the front member 120, and at least one rear protrusion 154 is adjacent an exterior face 126a of the rear member 125 and at least one rear protrusion 154 is adjacent an interior face 126b of the rear member 125 such that a line passing between the two rear protrusions 154 must pass through the rear member 125.

To maintain the use configuration 100a in other embodiments, at least one front protrusion 152 is adjacent the front member interior face 121b and the front member 120 is coupled to the floor member 110 by a hinge that has about ninety degrees of travel, and at least one rear protrusion 154 is adjacent the rear member interior face 126b and the rear member 125 is coupled to the floor member 110 by a hinge that has about ninety degrees of travel.

To maintain the use configuration 100a in still other embodiments, at least one front protrusion 152 is adjacent the front member exterior face 121a and the front member 120 is coupled to the floor member 110 by a hinge that has about two hundred and seventy degrees of travel, and at least one rear protrusion 154 is adjacent the rear member exterior face 126a and the rear member 125 is coupled to the floor member 110 by a hinge that has about two hundred and seventy degrees of travel.

It is understood that while certain forms of this invention have been illustrated and described, it is not limited thereto except insofar as such limitations are included in the following claims and allowable functional equivalents thereof.

The invention claimed is:

1. A collapsible animal transport apparatus, comprising:
a generally planar floor member having opposed front and rear sides and opposed first and second lateral sides;
a rear member having opposed upper and lower sides and opposed first and second lateral sides, said rear member lower side being rotatably coupled to said floor member rear side;
a front member having opposed upper and lower sides and opposed first and second lateral sides, said front member lower side being rotatably coupled to said floor member front side; said front member having at least one door;
a first side member having opposed upper and lower sides and opposed front and rear sides, said first side member lower side being rotatably coupled to said floor member first side;
a second side member having opposed upper and lower sides and opposed front and rear sides, said second side member lower side being rotatably coupled to said floor member second side;
a first roof member having opposed front and rear sides and opposed exterior and interior sides, said first roof member exterior side being rotatably coupled to said first side member upper side; and
a second roof member having opposed front and rear sides and opposed exterior and interior sides, said second roof member exterior side being rotatably coupled to said second side member upper side, said second roof member interior side being removably coupled to said first roof member interior side;
wherein:
said front and rear members, said first and second side members, and said first and second roof members are movable between a storage configuration and a use configuration;
said front sides of said first and second roof members being adjacent said front member upper side when at said use configuration;
said rear sides of said first and second roof members being adjacent said rear member upper side when at said use configuration;

said first roof member interior side being coupled to said second roof member interior side when at said use configuration;

said first roof member interior side being separated from said second roof member interior side when at said storage configuration;

said rear member first lateral side being adjacent said floor member first lateral side when at said storage configuration;

said front member first lateral side being adjacent said rear member first lateral side when at said storage configuration;

said front sides of said first and second side members and said first and second roof members being adjacent said floor member front side when at said storage configuration;

said first roof member and said second roof member are situated parallel to said floor member when at said use configuration and when situated at said storage configuration;

said first roof member interior side is removably coupled to said second roof member interior side with a latch;

said at least one door is a pair of doors spaced apart from one another, each of said pair of doors having a vented construction and a lock to selectively maintain said each door at a closed position;

said front member has exterior and interior faces; and said front member is coupled to said floor member by at least one hinge that has about ninety degrees of travel.

2. The apparatus of claim 1, wherein:

said front sides of said first and second side members and said first and second roof members have front protrusions extending therealong that are adjacent said front member when at said use configuration; and said rear sides of said first and second side members and said first and second roof members have rear protrusions extending therealong that are adjacent said rear member when at said use configuration.

3. The apparatus of claim 2, wherein:

said front member has exterior and interior faces; and at least one said front protrusion is adjacent said front member exterior face when at said use configuration.

4. The apparatus of claim 3, wherein at least one said front protrusion is adjacent said front member interior face when at said use configuration.

5. The apparatus of claim 3, wherein:

said rear member has exterior and interior faces; and at least one said rear protrusion is adjacent said rear member exterior face when at said use configuration.

6. The apparatus of claim 2, wherein said front and rear protrusions provide structural stability to said first and second side members and said first and second roof members.

* * * * *